United States Patent
Liang

(10) Patent No.: US 6,730,008 B1
(45) Date of Patent: May 4, 2004

(54) DIFFERENTIAL SHAFT FOR A STRIP-PRODUCING MACHINE

(76) Inventor: Shih Wen Liang, No. 142 Won Fong Village, Fu Hsing Hsiang, Changhua Hsien (TW)

(*) Notice: Subject to any disclaimer, the term of this patent is extended or adjusted under 35 U.S.C. 154(b) by 0 days.

(21) Appl. No.: 10/414,285

(22) Filed: Apr. 16, 2003

(51) Int. Cl.[7] ............................................. D01H 1/10
(52) U.S. Cl. ............................................. 492/40; 492/45
(58) Field of Search ............................. 492/39, 40, 45, 492/60, 16; 226/124, 152, 168, 174, 190, 191, 192; 19/258; 26/99, 100

(56) References Cited

U.S. PATENT DOCUMENTS

| | | | | |
|---|---|---|---|---|
| 455,123 | A | * | 6/1891 | McKnight ................... 235/102 |
| 523,290 | A | * | 7/1894 | McKay et al. ............ 144/250.1 |
| 1,671,522 | A | * | 5/1928 | Furbush ........................ 492/40 |
| 6,230,478 | B1 | * | 5/2001 | White ........................ 57/58.49 |
| 6,280,371 | B1 | * | 8/2001 | Krippelz ....................... 492/39 |
| 6,474,402 | B1 | * | 11/2002 | Sauer et al. ................. 164/428 |
| 2002/0042332 | A1 | * | 4/2002 | Eronen ......................... 492/40 |
| 2003/0181302 | A1 | * | 9/2003 | Kaiser et al. ................. 492/40 |

\* cited by examiner

*Primary Examiner*—I Cuda Rosenbaum
(74) *Attorney, Agent, or Firm*—Troxell Law Office PLLC

(57) ABSTRACT

A differential shaft for a strip-producing machine comprises a differential shaft mainly made up of a shaft core, a securing plug disposed at one end of the shaft core, a multiple of rolling tubes and partition rings each alternatively positioned with the other and sleeve joined in a sequence onto the shaft core thereof, and a fixing plug clamping tight of the partition rings and the rolling tubes thereof from the other end of the shaft core. The partition rings are stably located onto the shaft core via a pair of position pins engaged with a pair of stepwise retaining recesses of the shaft core with a ring gap A formed between the partition rings and the shaft core to reduce the friction thereof when the rolling tubes proceed with the strip production, effectively prolonging their lifespan in use. Moreover, pressed tight by said fixing plug, the partition rings can transversely move at the stepwise retaining recesses via pivot pieces of the position pins thereof, evenly distributing the clamping force onto each rolling tube for more smooth and efficient rolling movement thereof.

1 Claim, 7 Drawing Sheets

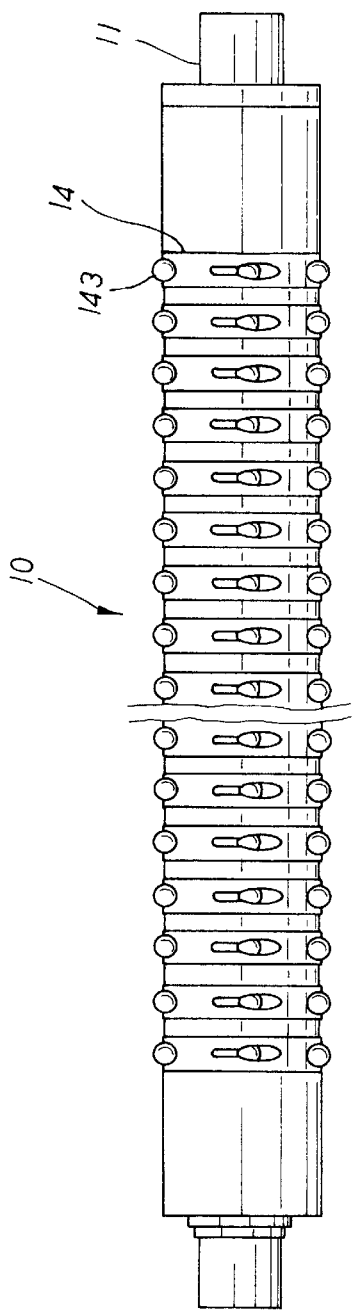
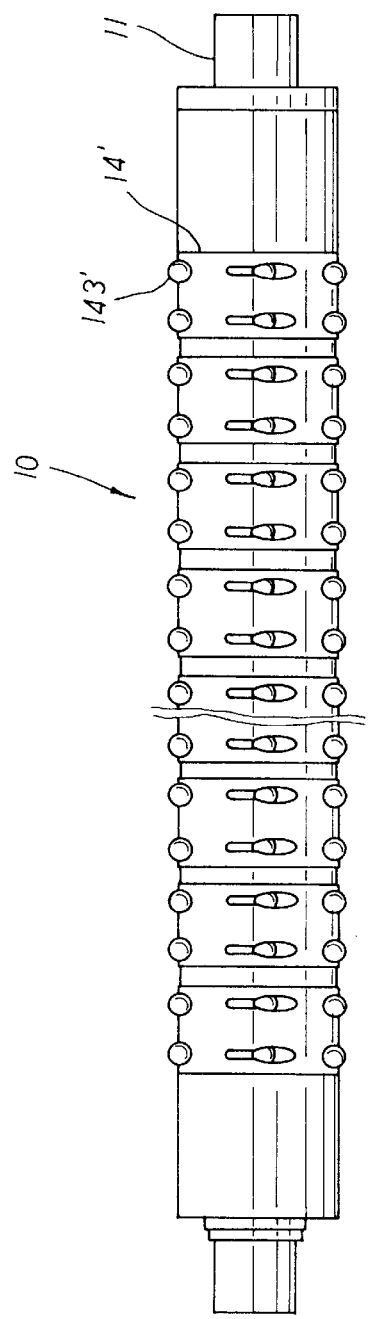
PRIOR ART  FIG. 2
PRIOR ART  FIG. 4

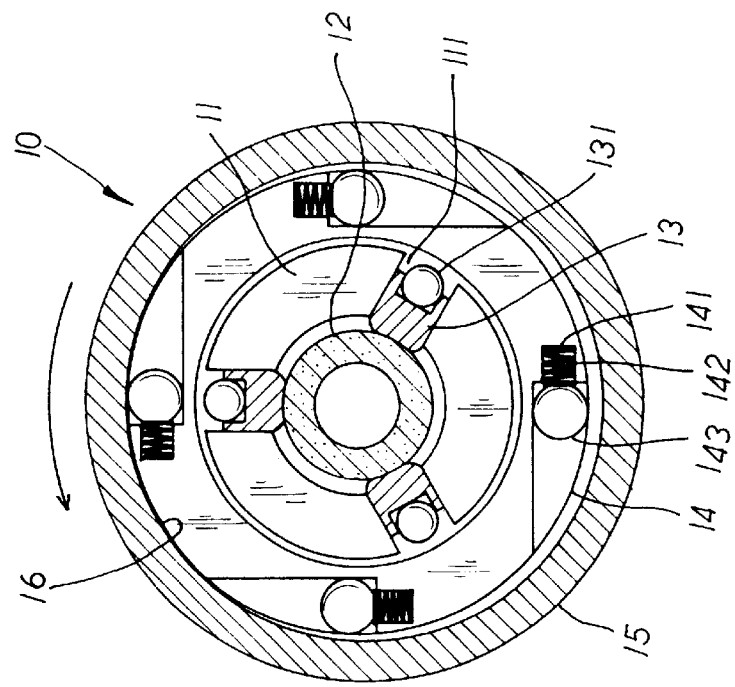
PRIOR ART FIG.3
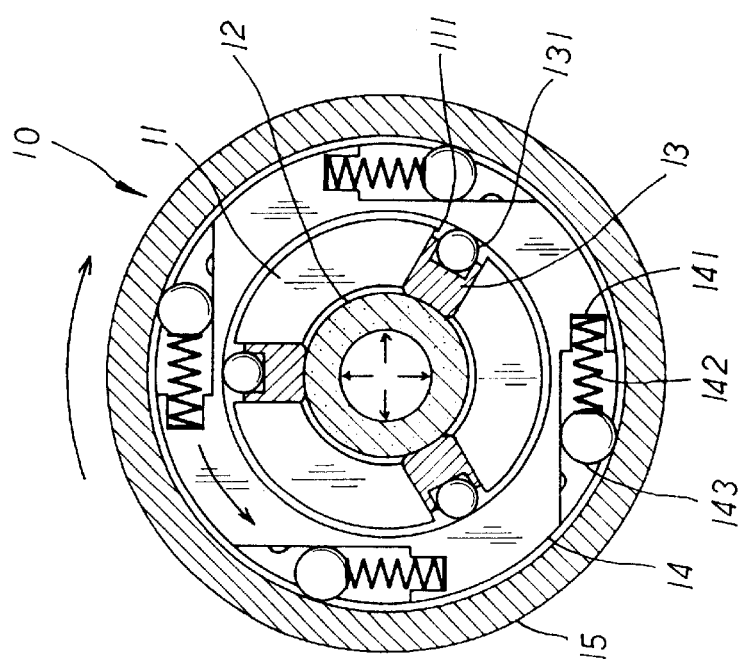
PRIOR ART FIG.6

DIFFERENTIAL SHAFT FOR A STRIP-PRODUCING MACHINE

BACKGROUND OF THE INVENTION

The present invention is related to a differential shaft for a strip-producing machine, comprising a differential shaft mainly made up of a shaft core, a securing plug disposed at one end of said shaft core, a multiples of rolling tubes and partition rings each alternatively positioned with the other and sleeve joined in a sequence onto the shaft core thereof, and a fixing plug clamping tight of said partition rings and rolling tubes thereof from the other end of the shaft core. Said partition rings are stably located onto said shaft core via a pair of position pins engaged with a pair of stepwise retaining recesses of the shaft core with a ring gap A formed there-between to reduce the friction thereof when the rolling tubes proceed with the strip production, effectively prolonging the lifespan thereof Moreover, pressed tight by said fixing plug, said partition rings can transversely move at the stepwise retaining recesses via pivot pieces of said position pins thereof, evenly distributing the clamping force onto each rolling tube for more smooth and efficient rolling movement thereof.

Please refer to FIG. 1. A conventional strip-producing machine 40 is mainly made up of a rolling shaft 41 onto which a whole piece of strip-material 411 is rolled up for further processing. When said strip-producing machine 40 is in operation, said strip-material 411 will be cut into a certain strips and rolled up respectively onto rolling tubes 421 of a differential shaft 42. Differential effect is produced according to the tightness of the strip-material rolled up by said rolling tubes 421 thereof. There are some conventional differential shafts for strip-producing machine 40.

Please refer to FIGS. 2, 3. A conventional air-pressure differential shaft 10 is mainly made up of a shaft core 11 having an air bag 12 adapted at the center thereof, and a multiple of retaining recesses 111 equidistantly defining the outer periphery thereof each having a pushing block 13 and a metal ball 131 adapted therein with said pushing block 13 abutting against said air bag 12 at one end thereof A plurality of sliding differential seats 14 are sleeve joined to the outer periphery of said shaft core 10 thereof, each having a plurality of transverse elongated slots 141 distributed in a row thereon for a spring 142 and a supporting metal ball 143 to be adapted therein. Another sliding differential seat 14' are enlarged in width, each having transverse elongated slots 141' aligned in double rows thereon for two springs 142' and two supporting metal balls 143' to be adapted therein respectively as shown in FIG. 4. Each of said sliding differential seats 14, 14' is applied with a rolling tube 15 at the outer periphery thereon as shown in FIG. 5. Said rolling rube 15 is pulled downward by gravity at one side, forming a contact area 16 with the upper periphery of said sliding differential seat 14, 14' thereon as shown in FIG. 3.

Please refer to FIG. 6. In operation, air is let in from one end of said differential shaft 10, inflating the air bag 12 of said shaft core 11 which then presses against said pushing blocks 13 thereof, extending said metal balls 131 outwards to contact with said sliding differential seats 14, 14' thereof. Meanwhile, said sliding differential seats 14, 14' and rolling tubes 15 are activated to rotate in different directions. Said springs 142 are expanded outwards with said supporting metal balls 143 abutting against said rolling tubes 15 in rolling manner for strip production.

There are some drawbacks to such conventional air-pressure differential shaft 10. First, the rolling tubes 15 are sleeve joined to the sliding differential seats 14 with a contact area limited only for strips of more than 50 mm in width It's hard to produce slim strips of under 50 mm. Second, the assembly parts of said air-pressure differential shaft 10 are multiple and complicated, which not only increases costs of material and production but also time of assembly itself. Third, said rolling tubes 15 are activated via the pushing force of said springs 142 which are easily worn out of use, inconveniently increasing the time and cost of maintenance.

Please refer to FIG. 7. Another conventional differential shaft 20 for a strip-producing machine is mainly made up of a shaft core 21 having a securing plug 22 sleeve joined at one end thereof, a locating groove 211 transversely defining the upper periphery thereof, a plurality of rolling tubes 23 and partition rings 24 alternatively sleeve joined in a sequence thereon, and a fixing plug 25 clamping tight of said rolling tubes 23 and said partition rings 24 from the other end thereof. Each of said partition rings 24 has a locating rib 241 projecting at the internal upper periphery thereof to be engaged with the locating groove 211 of said shaft core 21 for location thereof.

There are some drawbacks to such conventional differential shaft 20 for a strip-producing machine. First, said partition rings 24 are pulled naturally downwards by gravity which may increase the friction of the locating ribs 241 with both sides of the locating grooves 211 thereof Moreover, the internal upper side of said partition rings 24 has a larger contact area with said shaft core 21. When said partition rings 24 along with said rolling tubes 23 are pressing tight via said fixing plug 25 from one end of said shaft core 21, resistance of friction thereof may gradually cut down the pressing force thereof delivered to each rolling tube 23 as shown in FIG. 7. Thus, in operation, said rolling tubes 23 can't move smoothly and evenly in rolling manner, affecting the differential effect of each rolling tube 23 in strip production. Second, under constant friction in a long time, said shaft core 21, said rolling tubes 23, and said partition rings 24 tend to be easily overheating and worn out of use quickly, greatly reduced in lifespan thereof. Third, said partition rings 24 unstably fixed onto said shaft core 21 only at one side via said locating ribs 241 engaging with said locating grooves 211 thereof may be inconveniently shaken when said shaft core 21 and said rolling tubes 23 are in rolling manner.

SUMMARY OF THE PRESENT INVENTION

It is, therefore, the primary purpose of the present invention to provide a differential shaft for a strip-producing machine wherein said differential shaft is suitable for the production of a wide range of strips, even for slim strips of under 5 mm in width. Said differential shaft has a plurality of partition rings stably located onto a shaft core via a pair of position engaged with a pair of stepwise retaining recesses of the shaft core with a ring gap A formed there-between. When pressed tight by a fixing plug from one end of said shaft core, said partition rings can transversely move at the stepwise retaining recesses via pivot pieces of said position pins thereof, evenly distributing the clamping force onto each rolling tube for more smooth and efficient rolling movement thereof in strip-production.

It is, therefore, the secondary purpose of the present invention to provide a differential shaft wherein the ring gap A thereof can prevent the direct contact of said partition rings with the shaft core thereof, reducing the friction and thus the overheating thereof when the rolling tubes proceed with the producing of strips, effectively prolonging the lifespan thereof.

It is, therefore, the third purpose of the present invention to provide a differential shaft for a strip-producing machine wherein said position pins disposed symmetrically at the internal upper and lower periphery of said partition rings can stably located said partition rings onto said shaft core without said partition rings thereof being unevenly shaken when said rolling tubes and said shaft core are moved in rolling manner.

BRIEF DESCRIPTION OF THE DRAWINGS

FIG. 2 is a sectional view of a conventional air-pressure differential shaft in assembly.

FIG. 3 is a sectional view showing the differential shaft and the rolling tube of a conventional air-pressure differential shaft in assembly.

FIG. 4 is another sectional view of a conventional air-pressure differential shaft in assembly.

FIG. 6 is a sectional view of a conventional air-pressure differential shaft in operation.

DETAILED DESCRIPTION OF THE PREFERRED EMBODIMENTS

Figure 1:
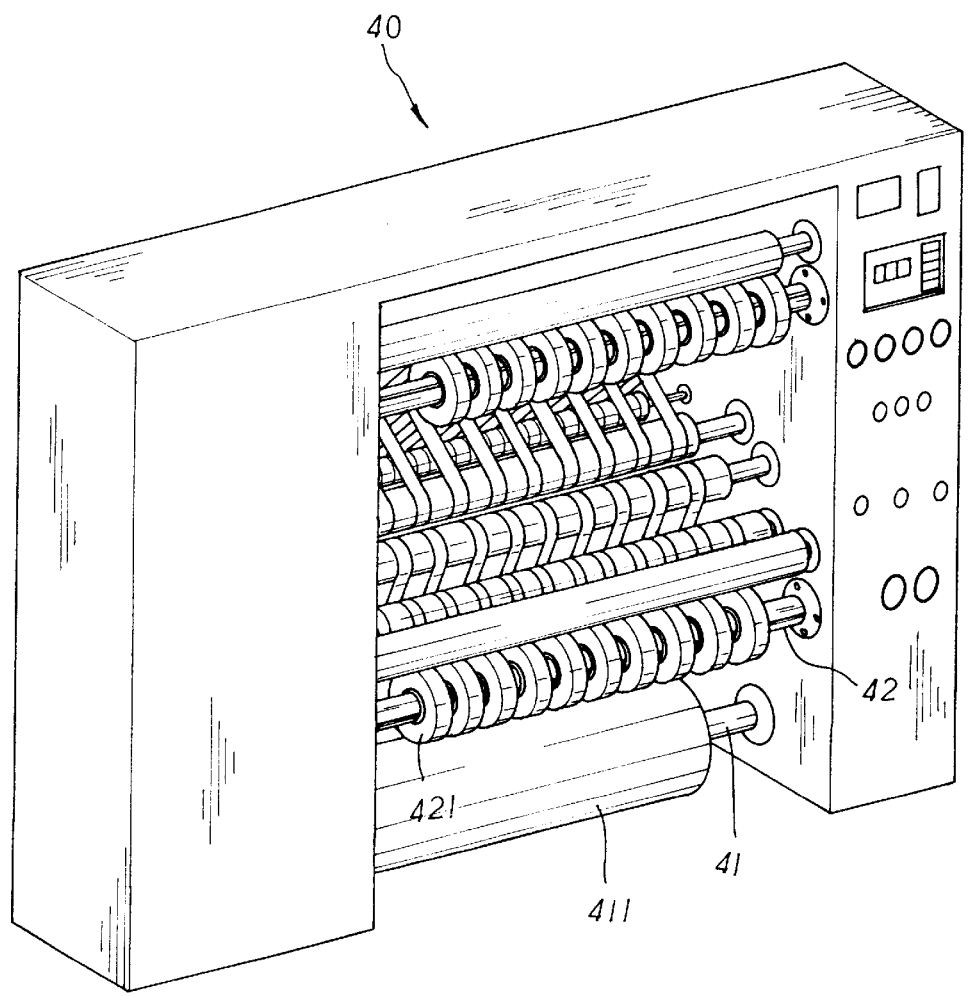
FIG. 1 is a perspective view of a conventional strip-producing machine.
Figure 5:
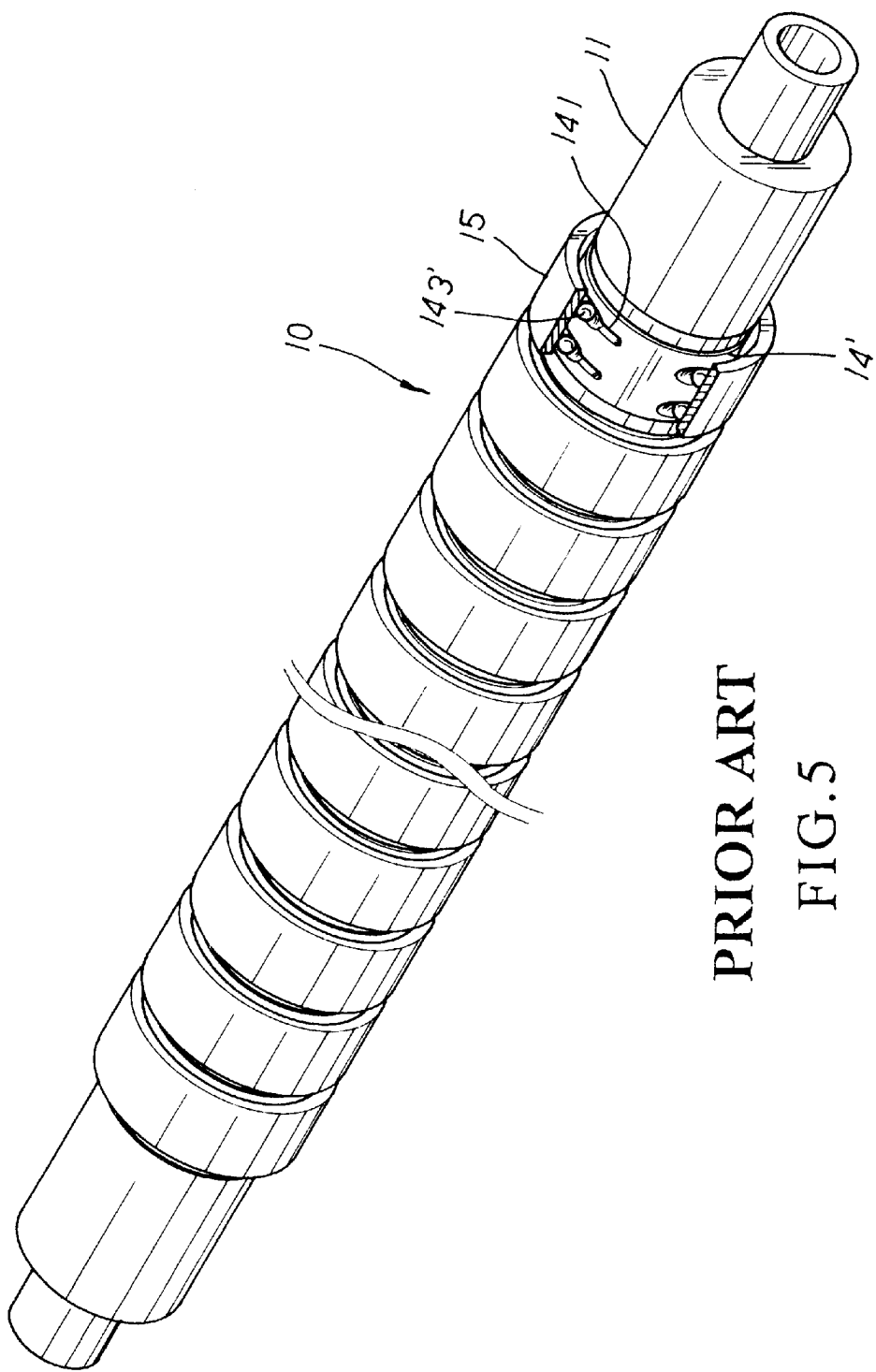
FIG. 5 is a perspective view of a conventional air-pressure differential shaft in assembly.
Figure 7:
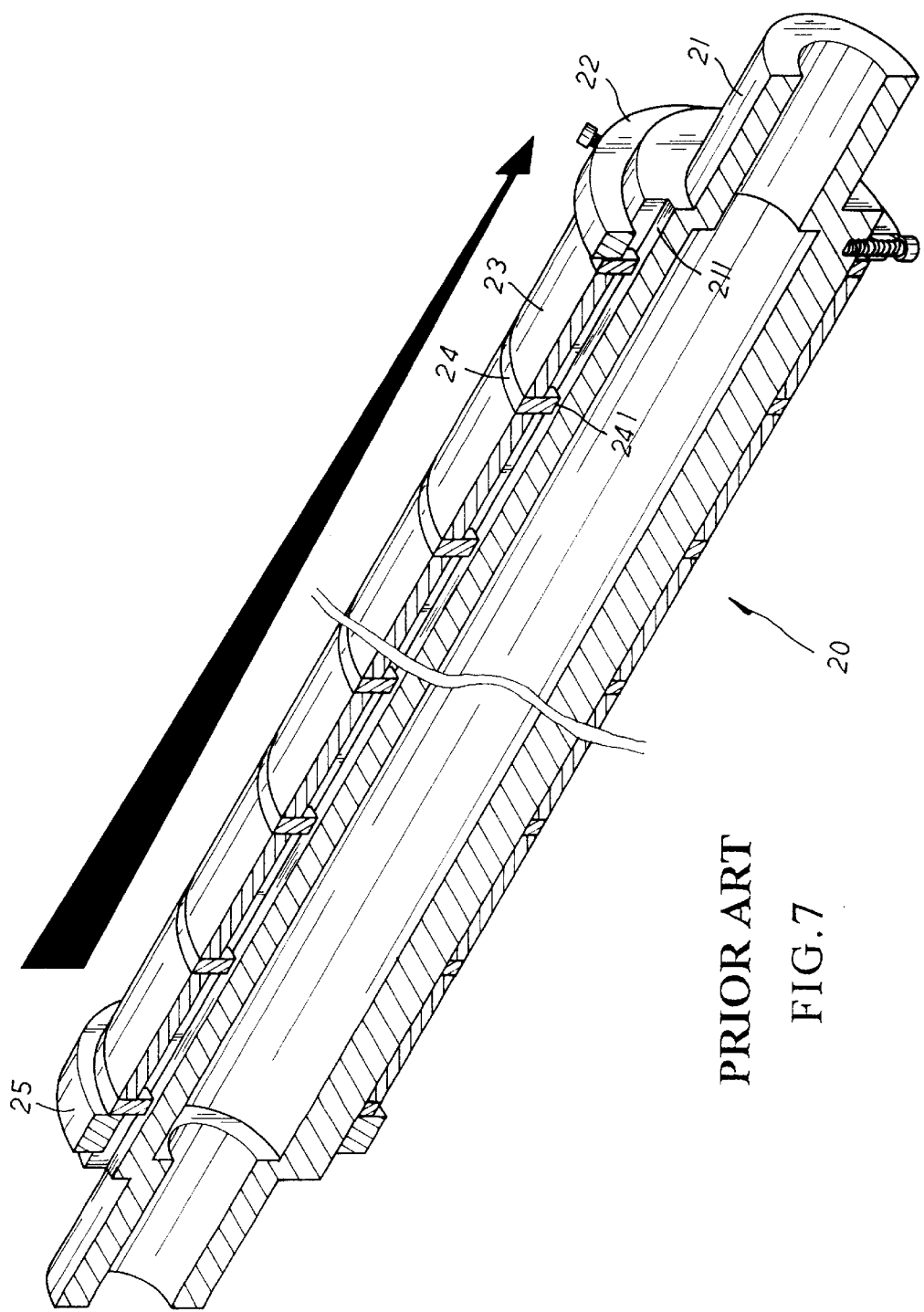
FIG. 7 is a sectional view of a second conventional differential shaft.
Figure 10:
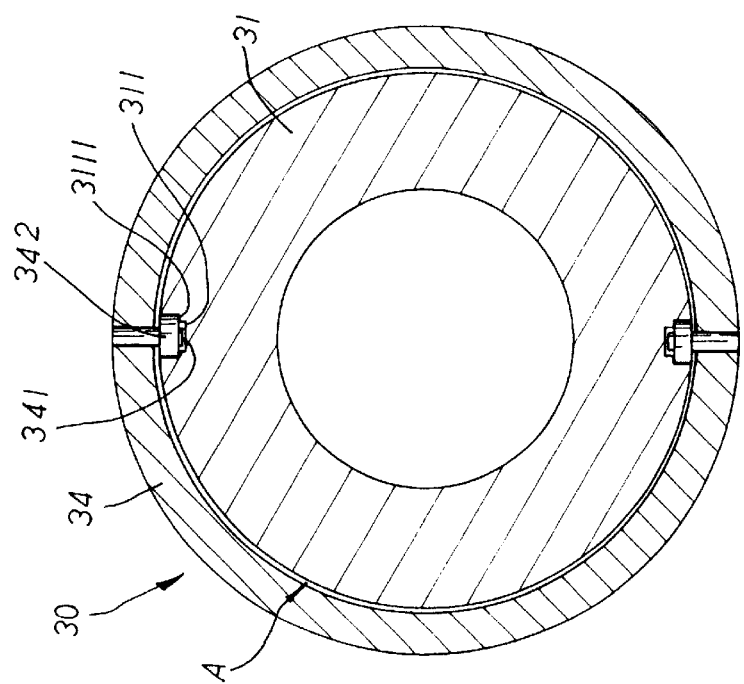
FIG. 10 is a sectional view of the present invention in assembly.
Figure 8:
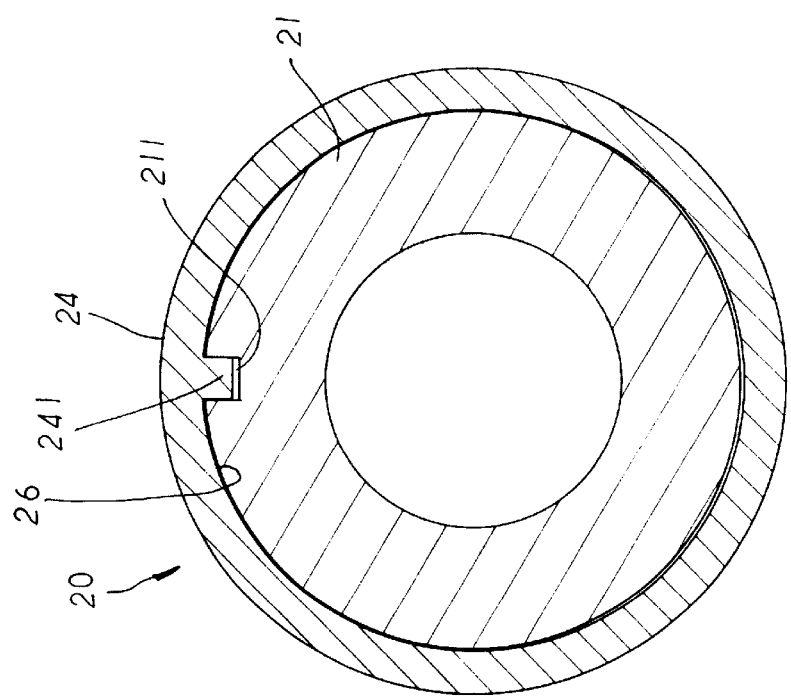
FIG. 8 is a sectional view of a second conventional differential shaft in assembly.
Figure 9:
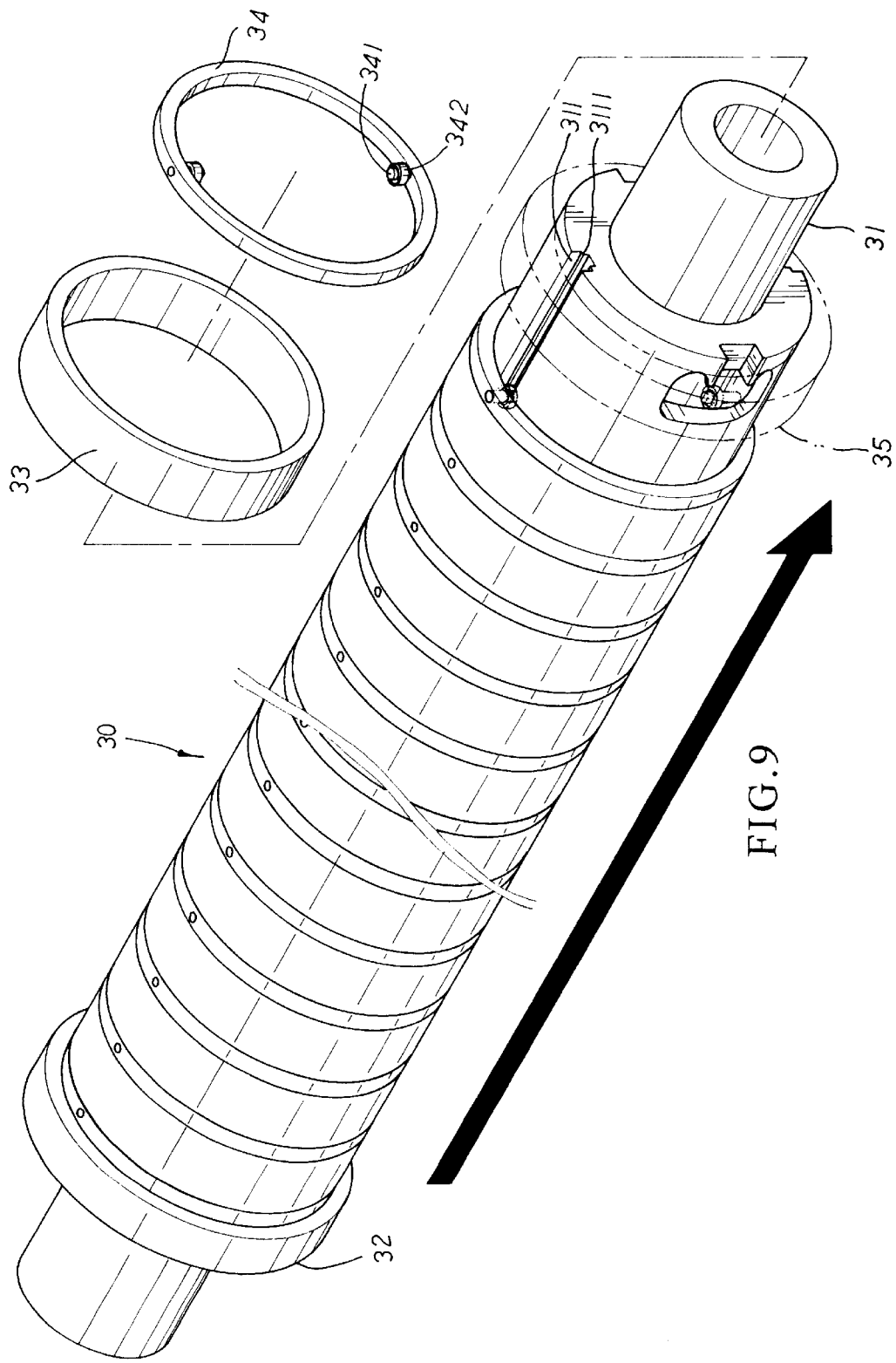
FIG. 9 is a perspective view of the present invention.

Please refer to FIGS. 9, 10. The present invention is related to a differential shaft for a strip-producing machine, comprising a differential shaft 30 mainly made up of a shaft core 31 disposed at the center thereof, a securing plug 32 sleeve joined at one end of said shaft core 31 thereof, a multiple of rolling tubes 33 and partition rings 34 each alternatively positioned with the other and sleeve joined in a sequence onto said shaft core 31 thereof, and a fixing plug 35 disposed at the other end of said shaft core 31 thereof.

Said rolling tubes 33 can be adjusted in size according to the strips to be produced, even for slim strips of under 5 mm. The upper and lower periphery of said shaft core 30 are symmetrically defined by a pair of stepwise retaining recesses 311 each having a step 3111 disposed at the bottom thereof. Each of said partition rings 34 is equipped with a pair of positioning pins 341 symmetrically disposed at the internal upper and lower periphery thereof. Each of said positioning pins 341 has a transversely rotated pivot piece 342 disposed at the bottom thereof. The positioning pins 341 of said partition rings 34 are matched to the stepwise retaining recesses 311 of said shaft core 30 with said transversely rotated pivot pieces 342 thereof abutting against the steps 3111 of said stepwise retaining recesses 311 thereof. Meanwhile, a ring gap A is formed at the space defined by the internal periphery of said partition ring 34 and the external periphery of said shaft core 31 thereof as shown in FIG. 10. Said fixing plug 35 is applied from the other end of said shaft core 31, clamping tight said rolling tubes 33 and partition rings 34 alternatively in a sequence onto said shaft core 31 for secure location thereof.

When said differential shaft for a strip-producing machine is activated in rolling manner, said ring gap A thereof can prevent the inner side of said partition rings 34 from directly contacting with the shaft core 31 thereof. Thus, when the rolling tubes 33 proceed with the sorting and producing of strips thereof, the friction between said partition rings 34 and said shaft core 31 is cut down to the minimum. Moreover, when said rolling tubes 33 and said partition rings 34 are clamped tight from one end of said shaft core 31 via said fixing plug 35 thereof for location, the pivot pieces 342 of said partition rings 34 will transversely rotate and move at the steps 3111 of said stepwise retaining recesses 311 thereof, distributing the clamping force evenly onto each rolling tube 33 as shown by the arrow in FIG. 9. Said rolling tubes 33 can then roll more smoothly and evenly with each rolling tube 33 reaching an accurate differential efficiency. Even for said rolling tubes 33 to roll up 100 rolls, the error can be kept under 20% and the torsion can be adjusted in rolling operation. And with the friction thereof reduced to the minimum, the partition rings 34 and the shaft core 31 can avoid the disadvantage of overheating, effectively prolonging their lifespan in use. Via said positioning pins 431 thereof engaged with said stepwise retaining recesses 311 thereof, said partition rings 34 are stably sleeve joined onto said shaft core 31 without being shaken by the rolling movement of said rolling tubes 33 and said shaft core 31 thereof

What is claimed is:

1. A differential shaft for a strip-producing machine, comprising a differential shaft mainly made up of a shaft core, a multiple of rolling tubes and partition rings each alternatively positioned with the other and sleeve joined in a sequence onto said shaft core thereof, and a securing plug and a fixing plug sleeve joined at both ends of said shaft core thereof respectively; said differential shaft being characterized by that, the upper and lower periphery of said shaft core being symmetrically defined by a pair of stepwise retaining recesses each having a step disposed at the bottom thereof;

each of said partition rings having a pair of positioning pins symmetrically disposed at the internal upper and lower periphery thereof; each said positioning pin having a transversely rotated pivot piece disposed at the bottom thereof;

whereby, the positioning pins of said partition rings are matched to the stepwise retaining recesses of said shaft core with said transversely rotated pivot pieces thereof abutting against the steps of said stepwise retaining recesses for stable location of said partition rings onto said core shaft thereof; a ring gap A is formed at the space defined by the internal periphery of said partition ring and the external periphery of said shaft core, preventing the direct contact of said partition rings and said shaft core and thus reducing the friction thereof to the minimum when the rolling tubes proceed with the producing of strips thereof, effectively prolonging their lifespan in use; moreover, when said rolling tubes and said partition rings are clamped tight from one end of said shaft core via said fixing plug for location, the pivot pieces of said partition rings will transversely move at the steps of said stepwise retaining recesses thereof, distributing the clamping force evenly onto each rolling tube for more smooth and efficient rolling movement thereof.

* * * * *